(12) United States Patent
Kao

(10) Patent No.: US 6,988,435 B2
(45) Date of Patent: Jan. 24, 2006

(54) SAWDUST COLLECTION ASSEMBLY FOR A COMPOUND MITER SAW

(75) Inventor: Mei-Lan Kao, Taichung Hsien (TW)

(73) Assignee: P & F Brother Industrial Corporation, Taichung (TW)

( * ) Notice: Subject to any disclaimer, the term of this patent is extended or adjusted under 35 U.S.C. 154(b) by 0 days.

(21) Appl. No.: 10/414,033

(22) Filed: Apr. 16, 2003

(65) Prior Publication Data

US 2004/0060405 A1    Apr. 1, 2004

(30) Foreign Application Priority Data

Sep. 26, 2002   (TW)  .............................. 91215196 U

(51) Int. Cl.
*B26D 7/18* (2006.01)
*B27B 5/29* (2006.01)

(52) U.S. Cl. ...................... 83/100; 83/471.3; 83/486.1; 83/490

(58) Field of Classification Search .................. 83/100, 83/24, 98, 162, 165, 471.2, 471.3, 472, 473, 83/477.1, 485, 486, 486.1, 490, 581; 144/252.1; 409/137; 451/456

See application file for complete search history.

(56) References Cited

U.S. PATENT DOCUMENTS

| | | | | |
|---|---|---|---|---|
| 2,372,699 | A | * | 4/1945 | Wiken et al. .................. 83/100 |
| 5,445,056 | A | * | 8/1995 | Folci ............................ 83/100 |
| 5,782,153 | A | * | 7/1998 | Sasaki et al. .................. 83/162 |
| 6,470,778 | B1 | * | 10/2002 | Kaye, Jr. et al. ............... 83/100 |
| 6,510,772 | B2 | * | 1/2003 | Brickner, Jr. et al. ......... 83/100 |
| 6,742,425 | B2 | * | 6/2004 | Oktavec et al. ............... 83/100 |

* cited by examiner

*Primary Examiner*—Clark F. Dexter
(74) *Attorney, Agent, or Firm*—Rosenberg, Klein & Lee

(57) ABSTRACT

A sawdust collection apparatus for a compound miter saw includes a turntable and a sawdust collection assembly. The turntable is rotatably mounted on a base and has a cutting groove defined in the turntable and a sawdust guide communicating with the cutting groove. The sawdust collection assembly has a hollow sawdust duct with a sawdust channel communicating with the sawdust guide and a hollow sawdust entry duct with a sawdust entry port to receive sawdust and debris and a sawdust passage to communicate with the sawdust entry port. The sawdust channel is connected to a vacuum cleaner to efficiently pull sawdust and debris out of the miter saw through the sawdust channel and the sawdust passage.

3 Claims, 5 Drawing Sheets

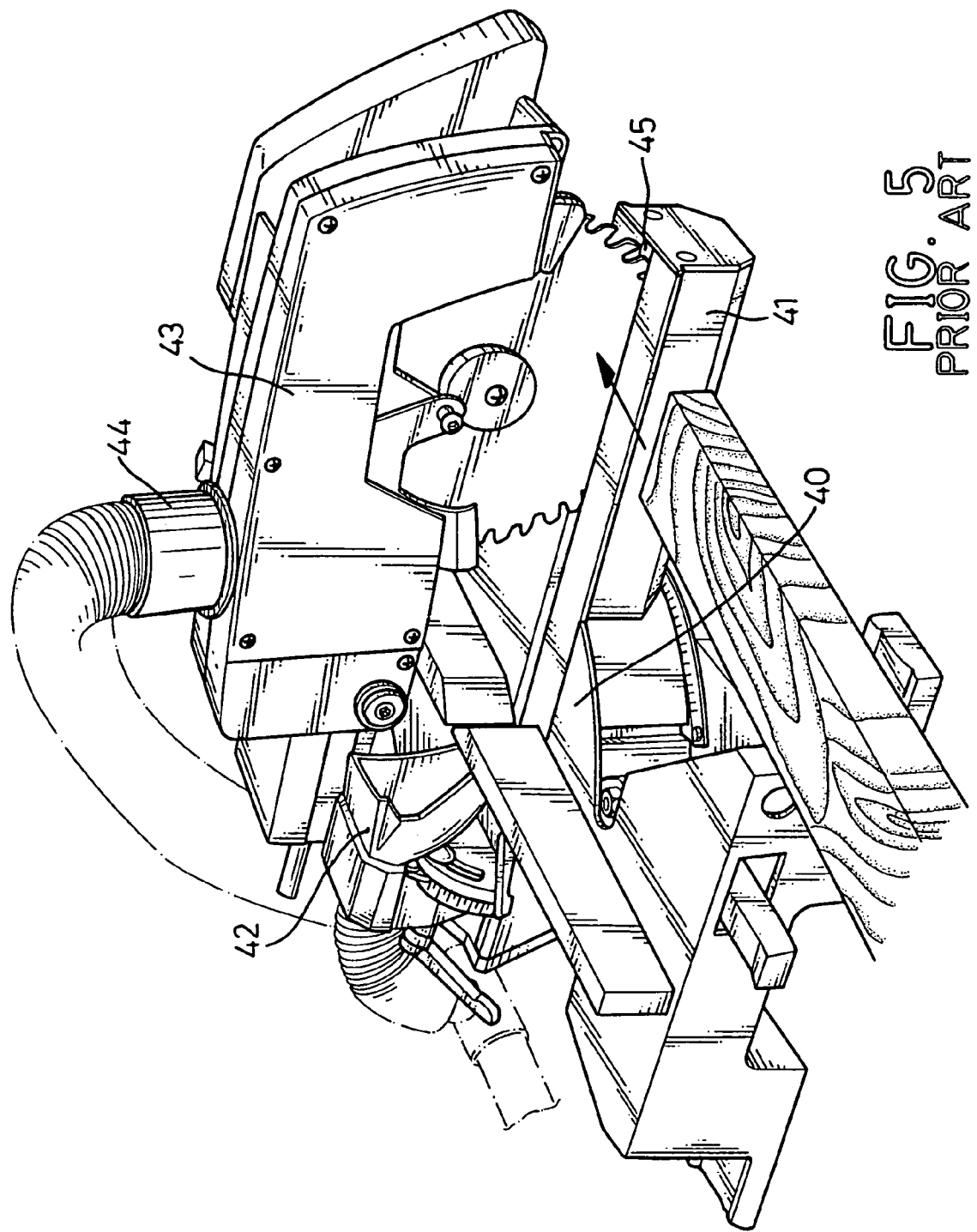

SAWDUST COLLECTION ASSEMBLY FOR A COMPOUND MITER SAW

BACKGROUND OF THE INVENTION

1. Field of the Invention

The present invention relates to a sawdust collection assembly, and more particularly to a sawdust collection assembly for a compound miter saw to efficiently collect the sawdust when the miter saw cuts a workpiece.

2. Description of Related Art

Compound miter saws are used to make angular cuts in a workpiece of metal, wood or other material. Modern conventional compound miter saws use circular saws to cut workpieces. However, a lot of sawdust is generated when the circular saw cuts a workpiece, and the sawdust can and does interfere with subsequent cutting operations.

With reference to FIG. 4, a conventional compound miter saw with a conventional sawdust collection device in accordance with the prior art comprises a base assembly (30), a turntable (31) having a cuffing board (32), a turning disk (33), a cutting groove (35), a cutting assembly (34) and a bracket assembly (not numbered). The turning disk (33) is rotatably mounted on the base assembly (30). The cutting board (32) is elongated and protrudes from the turning disk (33). The cutting groove (35) is defined in the turntable (31) from the cutting board (32) to the turning disk (33).

The bracket assembly is mounted in the turning disk (33) opposite to the cutting board (32). The cutting assembly (34) is pivotally attached to the bracket assembly and has a body (37), a saw blade (36) and a vacuum port (38). The body (37) is pivotally attached to the bracket assembly. The saw blade (36) is rotatably mounted in the body (37) to cut workpieces. The vacuum port (38) is defined through the body (37), aligned tangentially with the saw blade (36) and adapted to connect to a vacuum cleaner (not numbered). When the saw blade (36) cuts a workpiece (not shown), the operation produces lots of sawdust that moves along a line tangent to the saw blade (36). The vacuum cleaner draws air with the sawdust out of the miter saw through the vacuum port (38).

However, the conventional sawdust collection system still has some shortcomings. Large pieces of debris and some sawdust directly fall into the cutting groove (35). The conventional sawdust collection system cannot keep the cutting groove (35) completely clear of debris and sawdust. The miter saw must be turned off periodically to clean the sawdust and debris out of the cutting groove (35). Otherwise, the sawdust and debris will adversely affect the cutting precision, convenience or efficiency of the cutting operation.

With reference to FIG. 5, another kind of compound miter saw with a sawdust collection system has typical features as in the foregoing description except for the sawdust collection system. The compound miter saw has a base assembly (40), a turntable (41) having a cutting groove (45), a bracket assembly (not numbered), a sawdust collection assembly (not numbered) and a cutting assembly (not numbered) having a saw blade (not numbered) and a body (43). The sawdust collection assembly comprises a vacuum port (44), a sawdust entry port (42), a vacuum cleaner (not shown) and associated suction tubes (not numbered) and connectors (not numbered). The vacuum port (44) and the sawdust entry port (42) are adapted to connect respectively to suction tubes that are connected to the suction side of a vacuum cleaner (not shown) through a connector. The vacuum port (44) is defined in the body (43). The sawdust entry port (42) is mounted in the bracket assembly. When the saw blade makes a cut, the sawdust and any chips or debris are drawn out of the miter saw through the vacuum port (44) and the sawdust entry port (42) by the vacuum cleaner suction. However, the sawdust entry port (42) is located a distance from the saw blade. The sawdust collection system still cannot efficiently vacuum the sawdust and debris, especially in the cutting groove (45) and around the bracket assembly. Furthermore, each of the vacuum port (44) and the sawdust entry port (42) needs a connecting suction tube to connect to the vacuum cleaner. The connecting suction tubes will increase cost and occupy a big volume.

To overcome the shortcomings, the present invention provides a sawdust collection assembly for a compound miter saw to mitigate or obviate the aforementioned problems.

SUMMARY OF THE INVENTION

The main objective of the invention is to provide a sawdust collection assembly for a compound miter saw to efficiently vacuum sawdust and debris that are produced by cutting a workpiece.

Other objectives, advantages and novel features of the invention will become more apparent from the following detailed description when taken in conjunction with the accompanying drawings.

BRIEF DESCRIPTION OF THE DRAWINGS

FIG. 5 is a perspective view of another kind of conventional compound miter saw in accordance with the prior art.

DETAILED DESCRIPTION OF PREFERRED EMBODIMENT

Figure 1:
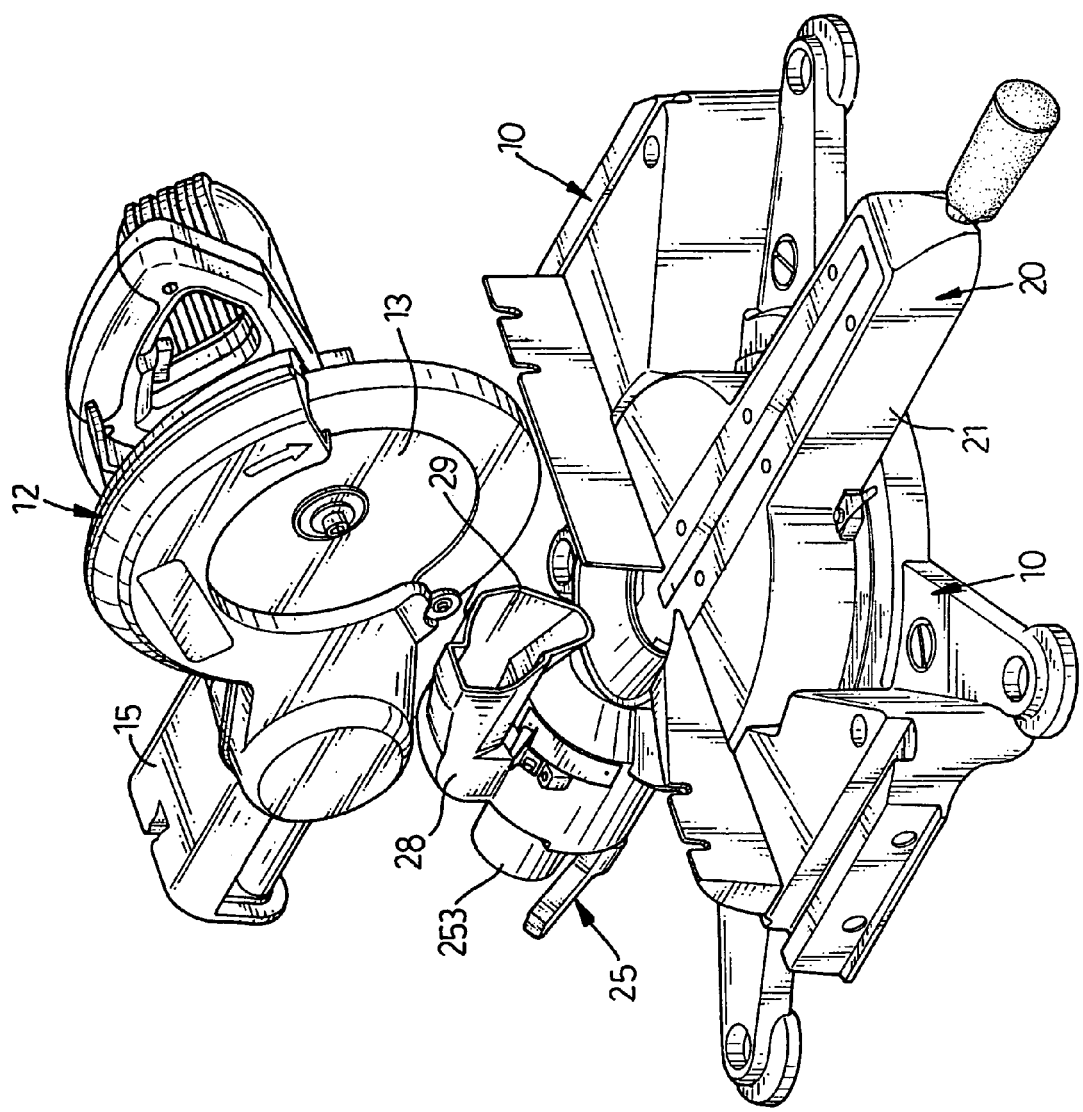
FIG. 1 is a perspective view of a compound miter saw with a sawdust collection assembly in accordance with the present invention.
Figure 2:
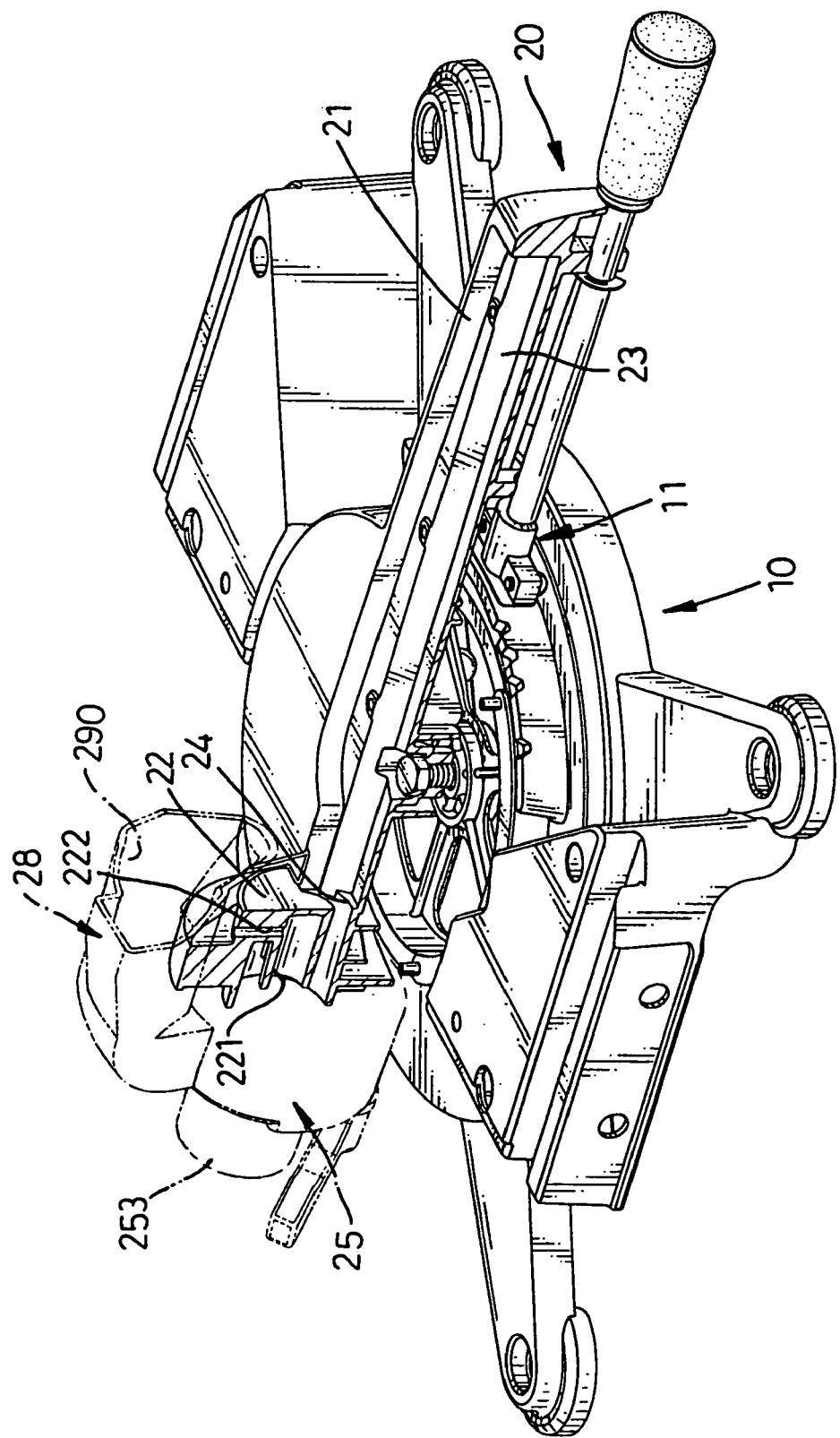
FIG. 2 is a perspective view in partial section of a part of the compound miter saw in FIG. 1 with the sawdust collection assembly.
Figure 3:
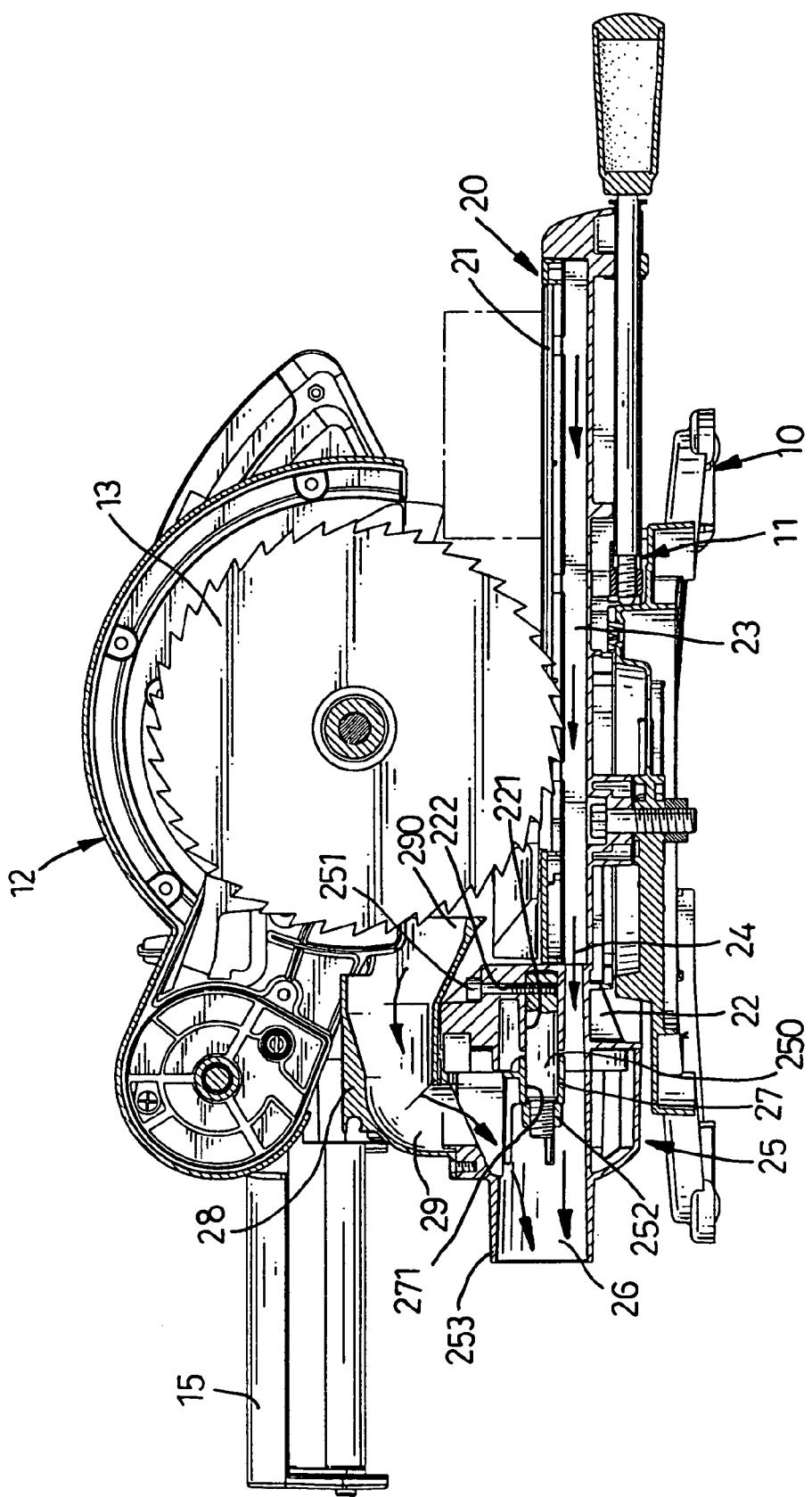
FIG. 3 a side plan view in partial section of the compound miter saw in FIG. 1.
Figure 4:
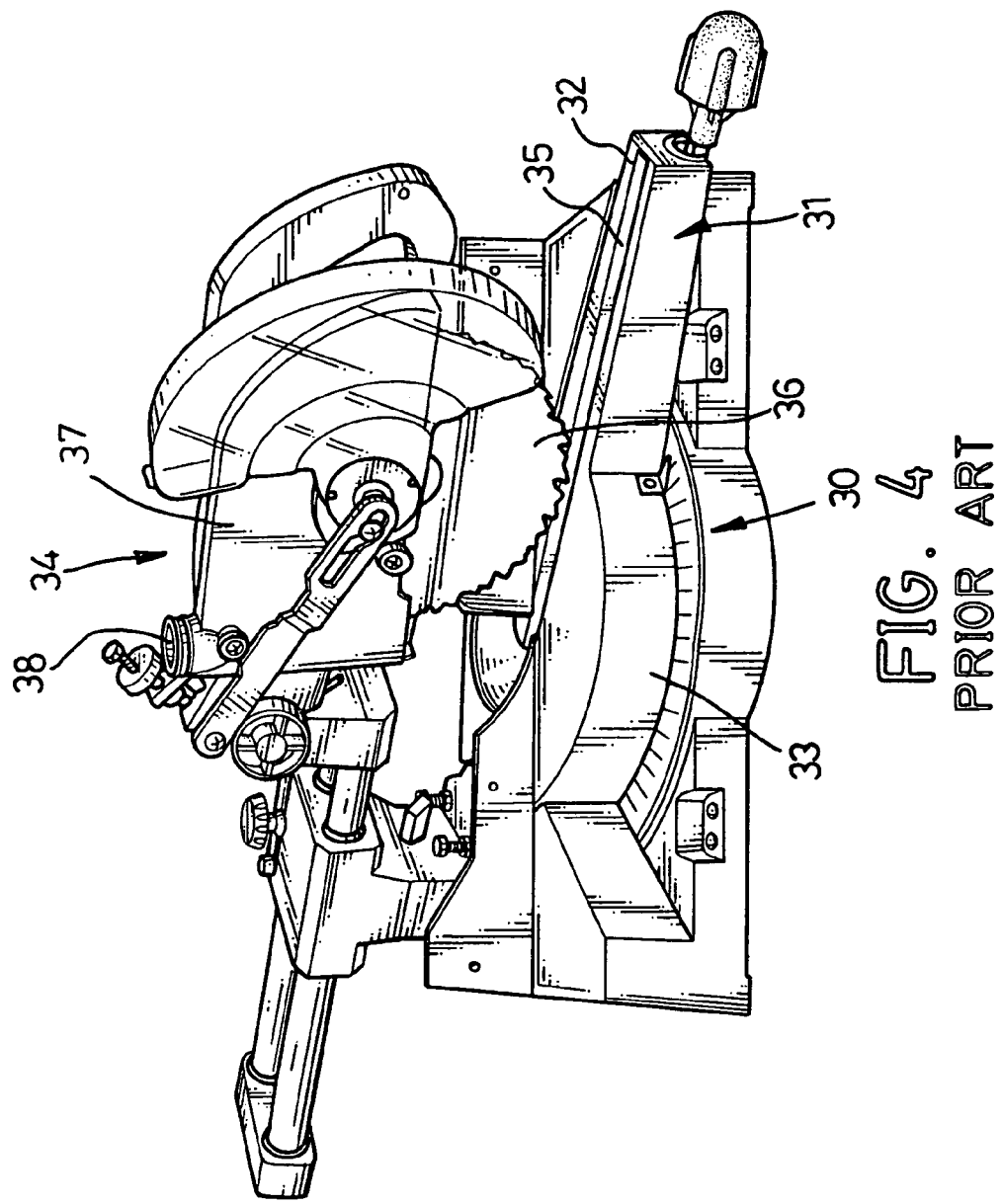
FIG. 4 is a perspective view of a conventional compound miter saw in accordance with the prior art.

With reference to FIGS. 1 through 3, a compound miter saw typically comprises a base assembly (10), a miter device (11), a turntable (20), a cuffing assembly (12), a bracket assembly (15) and a sawdust collection assembly (25). The turntable (20) is rotatably mounted on the base assembly (10) with the miter device (11) adapted for miter cutting. The turntable (20) has a turning disk (not numbered), an elongated cutting board (21) and a cutting groove (23). The turning disk is rotatably mounted on the base assembly (10). The cutting board (21) is formed on and extends from the turning disk. The cutting groove (23) is defined in the turntable (21) from the turning disk to the cutting board (21).

The bracket assembly (15) is mounted on the turning disk on the base (10) and is known in prior art miter saws. The cutting assembly (12) is pivotally connected to the bracket assembly (15), and a saw blade (13) is mounted in the cutting assembly (12). A person skilled in this art will recognize that the basic operation of the compound miter saw is easy. Therefore, a detailed description of the operation of the compound miter saw is not provided.

The sawdust collection assembly (25) is mounted on the turning disk and has a hollow sawdust duct (253), a hollow sawdust entry duct (28), a connecting seat (22), a sawdust guide (24), a positioning stud (250), a setscrew (251) and a nut (252).

The connecting seat (22) is formed on the turning disk opposite the cutting board (21) to connect the hollow sawdust duct (253) and has a first positioning hole (221) and a setscrew hole (222). The first positioning hole (221) is defined through the connecting seat (22) and faces the hollow sawdust duct (253). The setscrew hole (222) is vertically defined through the connecting seat (22) and communicates with the first positioning hole (221). The sawdust guide (24) is defined in the turntable (20) and communicates with the cuffing groove (23) and the hollow sawdust duct (253).

The hollow sawdust duct (253) is attached to the connecting seat (22) and has a sawdust channel (26), a positioning seat (27), a top (not numbered), a front (not numbered) and a rear (not numbered). The front of the hollow sawdust duct (253) is attached to the connecting seat (22). The rear of the hollow sawdust duct (253) is adapted to connect to a vacuum cleaner (not shown) through a connecting tube (not shown). The sawdust channel (26) is axially defined through the hollow sawdust duct (253) from the front to the rear and communicates with the sawdust guide (24) in the turntable (20). The sawdust channel (26) has an inner surface (not numbered). The positioning seat (27) is attached to the inner surface of the sawdust channel (26) and has a second positioning hole (271) aligned with the first positioning hole (221) in the connecting seat (22).

To assemble the hollow sawdust duct (253) and the connecting seat (22), the positioning stud (250) is held in the two positioning holes (221, 271). The positioning stud (250) has an inside end (not numbered), an outside end (not numbered), an external thread (not numbered) and a threaded hole (not numbered). The external thread is defined around the outside end of the positioning stud (250). The threaded hole is defined diametrically through the positioning stud (250) near the inside end and is aligned with the setscrew hole (222) in the connecting seat (22). The outside end of the positioning stud (250) extends out of the second positioning hole (271) in the positioning seat (27), and the nut (252) is screwed onto the external thread to hold the positioning stud (250) and to attach the hollow sawdust duct (253). The setscrew (251) has an enlarged end (not numbered) and a threaded shaft (not numbered). The threaded shaft of the setscrew (251) passes through the setscrew hole (222) in the connecting seat (22) and is screwed into the threaded hole in the positioning stud (250) to hold the positioning stud (250) in position.

The hollow sawdust entry duct (28) is attached to the top of the sawdust duct (253) and has a sawdust passage (29), a sawdust entry port (290) and a front (not numbered). The sawdust passage (29) is defined in the hollow sawdust entry duct (28) and communicates with the sawdust entry port (290) and the sawdust channel (26) in the hollow sawdust duct (253). The sawdust entry port (290) has an outer contour (not numbered) to accommodate a portion of the saw blade (13) when the cuffer assembly is pivoted down to cut a workpiece.

When the vacuum cleaner is operating, the vacuum suction will draw air into the sawdust channel (26) and the sawdust passage (29) and pull the sawdust and debris out of the cutting groove (23) and the hollow sawdust entry duct (28). Since the sawdust entry port (290) has an outer contour to accommodate a portion of the saw blade (13), sawdust and debris will be projected along a tangent of the saw blade (13) into the hollow sawdust entry duct (28) through the sawdust entry port (290). Even sawdust and debris that falls into the cutting groove (23) will be pulled into the sawdust channel (26) through the sawdust guide (24). Consequently, the sawdust collection assembly (25) will vacuum most of the sawdust and debris from the compound miter saw. Furthermore, a person will not have to stop using the compound miter saw to remove sawdust and debris. Moreover, only one connecting tube is needed to connect the sawdust collection assembly (25) to the vacuum cleaner. The cost of the connecting tube is reduced, and a volume occupied by the connecting tube is minimized.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A compound miter saw comprising:
   (a) a base assembly,
   (b) a turntable rotatably mounted on the base assembly, the turntable having a cutting groove formed therein;
   (c) a bracket assembly mounted on the turntable;
   (d) a cutting assembly having a saw blade said cutting assembly being pivotally attached to the bracket assembly and aligned with the cutting groove of the turntable; and,
   (e) a sawdust collection assembly including:
      a connecting seat mounted on the turntable;
      a hollow sawdust duct having a front portion attached to the connecting seat, having a sawdust channel defined horizontally therethrough and having an inner surface, the connecting seat having a first positioning hole formed through the connecting seat and facing the hollow sawdust duct, a setscrew hole being formed vertically through the connecting seat and communicating with the first positioning hole;
      a positioning seat attached to the inner surface of the sawdust channel of the hollow sawdust duct and having a second positioning hole aligned with the first positioning hole of the connecting seat;
      a positioning stud held in the first and second positioning holes of the connecting seat and the positioning seat, respectively the positioning stud having an inside end and an outside end extending out of the second positioning hole of the positioning seat, the positioning stud having an external thread formed at the outside end thereof, and a threaded hole vertically formed through the inside end thereof, the threaded hole being aligned with the setscrew hole of the connecting seat;
      a nut threadedly engaged with the external thread at the outside end of the positioning stud to attach the hollow sawdust duct; and,
      a setscrew passing through the setscrew hole of the connecting seat and having an enlarged head and a threaded shaft, the threaded shaft of the setscrew passing through the setscrew hole of the connecting seat and threadedly engaged with the threaded hole of the positioning stud to hold the positioning stud in position;
      a hollow sawdust entry duct attached to a top of the hollow sawdust duct, a front of the hollow sawdust entry duct defining a sawdust entry port tangentially aligned with the saw blade for receiving sawdust and debris, the hollow sawdust entry duct having formed therein a sawdust passage communicating with the sawdust entry port and the sawdust channel of the hollow sawdust duct.

2. The compound miter saw as recited in claim 1, wherein the sawdust entry port has an outer contour shaped to accommodate a portion of the saw blade when the cutter assembly is pivoted downward to cut a workpiece.

3. The compound miter saw as recited in claim 1 further comprising a sawdust guide formed in the turntable and communicating with the cutting groove and the sawdust channel of the hollow sawdust duct.

* * * * *